(12) United States Patent
Cyr et al.

(10) Patent No.: US 12,520,967 B2
(45) Date of Patent: Jan. 13, 2026

(54) MODULAR POSITION AND STATE SENSING SYSTEM AND METHOD

(71) Applicant: PITCO FRIALATOR, INC., Bow, NH (US)

(72) Inventors: Steven J. Cyr, Londonderry, NH (US); Michael McGinnis, Windham, NH (US); Brian Gregory Brophy, Alton Bay, NH (US); Michael T. Fecteau, Derry, NH (US)

(73) Assignee: Pitco Frialator, Inc., Bow, NH (US)

( * ) Notice: Subject to any disclaimer, the term of this patent is extended or adjusted under 35 U.S.C. 154(b) by 927 days.

(21) Appl. No.: 17/770,552

(22) PCT Filed: Oct. 30, 2020

(86) PCT No.: PCT/US2020/058254
§ 371 (c)(1),
(2) Date: Apr. 20, 2022

(87) PCT Pub. No.: WO2021/087288
PCT Pub. Date: May 6, 2021

(65) Prior Publication Data
US 2022/0400901 A1 Dec. 22, 2022

Related U.S. Application Data

(60) Provisional application No. 62/938,594, filed on Nov. 21, 2019, provisional application No. 62/929,405, filed on Nov. 1, 2019.

(51) Int. Cl.
*A47J 37/12* (2006.01)
*G01D 5/24* (2006.01)

(52) U.S. Cl.
CPC ....... *A47J 37/1266* (2013.01); *A47J 37/1223* (2013.01); *G01D 5/24* (2013.01)

(58) Field of Classification Search
CPC ..... G01D 5/24; A47J 37/1266; A47J 37/1223; G01F 23/265
See application file for complete search history.

(56) References Cited

U.S. PATENT DOCUMENTS 5,776,530 A * 7/1998 Davis .................. A47J 37/1223
99/330
2003/0229404 A1 12/2003 Howard et al.
(Continued)

FOREIGN PATENT DOCUMENTS

WO WO-2016019259 A1 * 2/2016 ................ A23L 5/11
WO 2019/178435 A1 9/2019

OTHER PUBLICATIONS

Molex Connector website capture from Mar. 22, 2016 (Year: 2016).*
(Continued)

*Primary Examiner* — Steven W Crabb
(74) *Attorney, Agent, or Firm* — Seyfarth Shaw LLP; Brian Michaelis

(57) ABSTRACT

A multipurpose sensing module used in association with a removable filter pan includes a capacitive sensor that is disposed within or proximate to the removable filter pan such that the sensor is adapted to measure and determine status parameters and data of a fluid contained within the removable filter pan. A sealed control box is adapted to house sensor electronics that are in communication with the sensor. The sensor electronics are adapted to receive the status parameters and data from the capacitive sensor. A connector is adapted to allow the sensor electronics to communicate with a controller of the controlled system. The controller is adapted to determine a presence and status of the removable filter pan based on the communication between the sensor electronics and the controller.

3 Claims, 12 Drawing Sheets

(56) References Cited

U.S. PATENT DOCUMENTS

2011/0234244 A1\* 9/2011 Chambon .............. G01N 33/03
                                                          324/663
2016/0327279 A1\* 11/2016 Bhogal .................. F24C 7/085
2022/0018700 A1\* 1/2022 Griggs ................ A47J 37/1266

OTHER PUBLICATIONS

European Search Report dated Oct. 13, 2023 re Application No. 20880618.2-1001 / Patent No. 4051993 PCT/US2020058254.
CA Examiners Report dated Jun. 2, 2023 re Application No. 3,155,582 / PCT/US2020058254.
Molex Mini-Fit Blind Mate Interface (BMI) Connectors. Molex. 2016. Retrieved from the internet: https://www.mouser.com/new/molex/molex-mini-fit-bmi-connectors/.

\* cited by examiner

106B

106B

MODULAR POSITION AND STATE SENSING SYSTEM AND METHOD

RELATED APPLICATIONS

This application claims priority to U.S. Provisional Patent Application Ser. No. 62/929,405 filed Nov. 1, 2019 and U.S. Provisional Patent Application Ser. No. 62/938,594 filed Nov. 21, 2019 both of which are incorporated by reference herein in their entireties.

TECHNICAL FIELD

This specification relates to sensors, and in particular a multipurpose sensing system in a removable apparatus for use with various control systems.

BACKGROUND

Position sensors may be used to detect and determine if a filter pan is in place and correctly aligned within controlled cooking systems, such as a deep fryer. Such sensors, typically located at or near the edge of a removable filter pan can be problematic as they can be snagged, broken or otherwise damaged during movement of the filter pan. Additionally, contact sensor pads that are engaged or activated when the filter pan is in place can become dirty, damaged or otherwise incapacitated and are difficult to clean, repair or replace when located in hard-to-access areas.

For example, micro-switches may be used with filter pans to detect when the filter pans are positioned within the controlled cooking systems. These micro-switches are typically positioned at the rear of a filter pan cavity within the cooking system. However, the micro-switches are subject to difficult operating conditions that cause the micro-switches to break and mis-detect the presence of the filter pan. Further, the micro-switches also have limited functionality. The micro-switches are not able to detect and notify a user of the status of fluid within the filter pan, such as whether the filter pan is full or empty.

SUMMARY

The present disclosure provides a multipurpose sensing module with a sensor, on or in a filter pan in a cooking system, for use with a control system that operates across a wide range of viscosities of fluid, from partially solid to low viscosity, to determine a status and positioning of the filter pan. The highly reliable and sanitary position and state sensing system is implemented within or proximate to a filter pan, such as, for example, a removable filter pan used with the controlled cooking system to filter a cooking fluid. In an illustrative embodiment the sensor according to the disclosure is disposed within or proximate to the filter pan within which fluid is contained, wherein fluid in the filter pan may be fluid for cooking (e.g. cooking oil, lard or the like).

The multipurpose sensing module and system according to the disclosure comprises a sensor module having a capacitive sensor and sensor electronics, as well as a portion of a connector to interface with a controlled cooking/fryer system. The sensor is configured and disposed to determine the capacitance and presence of a cooking fluid within the removable filter pan. The sensor electronics provide an interface, via the connector, with a microcontroller or processor that is in communication with an interlock system for control of a filtration subsystem. The connector is disposed in association with the filter pan and adapted to determine when the filter pan is properly positioned and connected within the controlled cooking system. In the illustrative controlled cooking system context, the microcontroller is in communication with a fluid pumping interlock that controls, e.g. enables or disables, a fluid pumping/filtration system such as one or more fluid pumps used to pump fluid from a cooking vat to the filter pan to filter the fluid. The microcontroller may also, or alternatively, be in communication with a heating system interlock that controls, e.g. enables or disables, a heating system such as one or more burners.

In an illustrative embodiment of a deep fryer, the fryer has a removable filter pan. A multipurpose sensing module comprises a sensor within the removable filter pan and includes a connector portion that is disposed within or proximate to the removable filter pan. The connector portion on the filter pan is adapted to engage a mating connector portion in or on the deep fryer cabinet, and when engaged a sensor signal indicates presence of the removable filter pan, based on inter-connection of the connector portion on the removable filter pan and the mating connector portion in or on the deep fryer cabinet. The connector is adapted to blindly connect the removable filter pan to a main/system controller in the controlled cooking system and allow the sensor electronics to interface with the main controller of the deep fryer and sends static and dynamic feedback to the controller representative of the presence or absence and status of the removable filter pan within the deep fryer system. The main controller, based on the signal from the capacitive sensor via sensor electronics and connector, determines a status of fluid within the filter pan, e.g., full or empty.

Advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION

Figure 1:
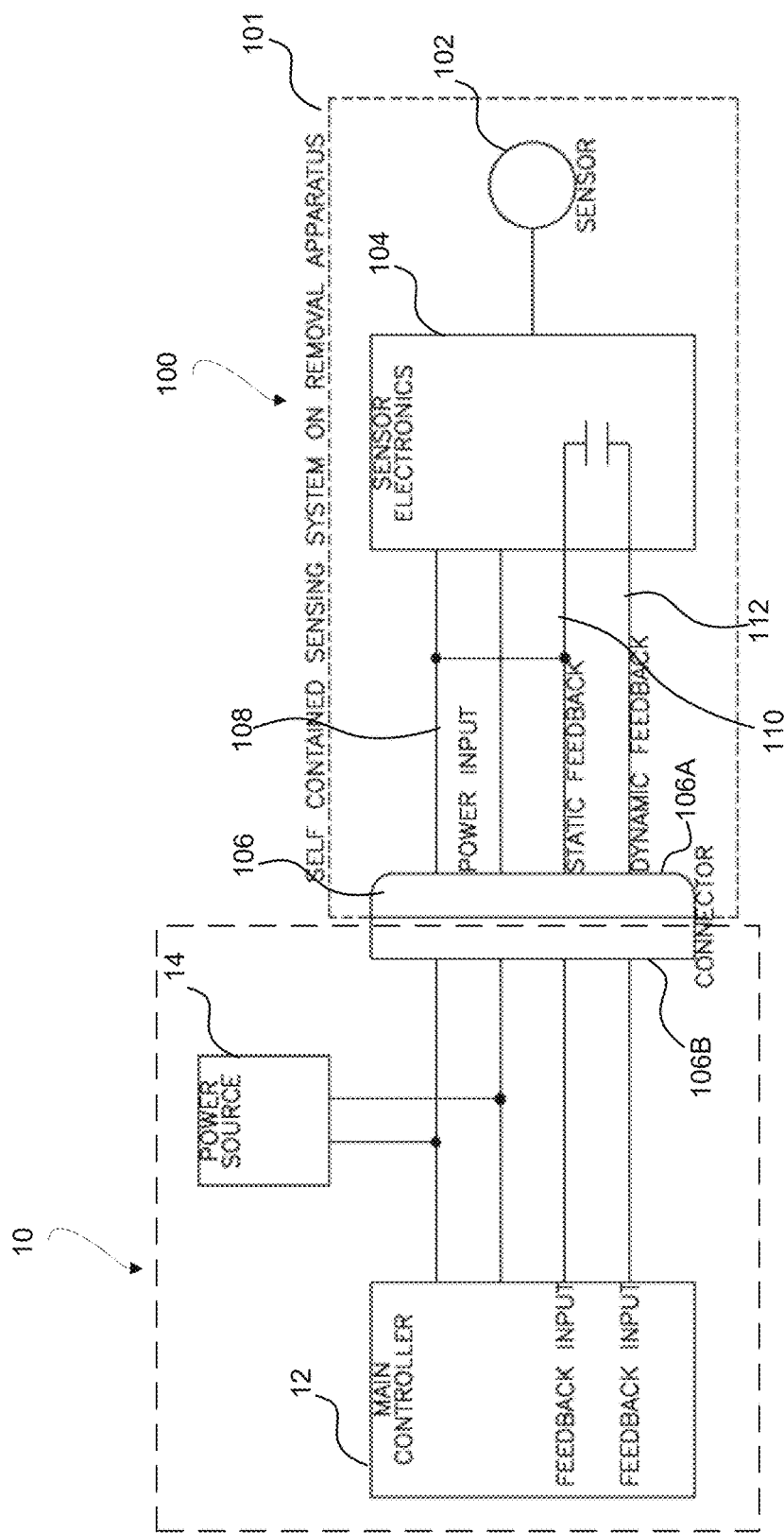
FIG. 1 is a block diagram of a multipurpose sensing module in a filter pan according to the disclosure.

A multipurpose sensing module 100 and system, according to the disclosure, constructed for installation in/on a filter pan 101, also called a filtration pan or drain pan in a controlled cooking system 10, such as a deep fryer, is illustrated in FIG. 1. An illustrative multipurpose sensing module 100, or presence detector unit, according to the disclosure is readily utilized with the deep fryer 10 where a cooking fluid, such as oil, may be pumped to and filtered through the filter pan 101. The filtration of the cooking fluid allows debris that is collected within the fryer 10 to be removed from the fluid. The controlled deep fryer system 10 may have a controller 12, such as a microprocessor and associated programming, control logic and/or electronics, that is adapted to control operation of the controlled system 10 and subsystems within the controlled system 10. In addition, the controlled system may also have a power source 14 that is adapted to power the controlled cooking system 10 and the controller 12. The power source 14 of the controlled system 10 may be used, according to the disclosure, to power the multipurpose sensing module 100 in/on the filter pan 101. It should be appreciated that although it is described that the multipurpose sensing module 100 is referred to as "in/on" the filter pan 101, the multipurpose sensing module 100 may be interior to (in) the pan, exterior to (on) the pan, but it also may be configured directly or indirectly adjacent to the filter pan and have the functionality as described herein. The term "in" the pan will be used herein to describe any of the various configurations by which the multipurpose sensing module 100 may be implemented to function as described.

In known fryer systems the removable nature of a filter pan may present problems if/when a filter pan is out of place or incorrectly installed within the controlled cooking system 10. Operation of the fryer 10 when the filter pan 101 is missing, misaligned or otherwise compromised can lead to spillage, leakage, or loss of hot cooking oil. To avoid such problems the present disclosure provides a multipurpose sensing module 100, or positioning and status detector unit disposed in the pan, and electrically and functionally interconnected to the controller of the controlled cooking unit or fryer.

The multipurpose sensing module 100 may be disposed in the filter pan 101 that is removable from the controlled cooking system 10, and affixed at a front portion facing toward the rear of the filter pan 101, as illustrated in more detail in FIGS. 2-6. The multipurpose sensing module 100 may include a sensor 102, or sensing device, and be adapted to measure parameters such as type of fluid surrounding the sensor 102 within the filter pan 101, ensure positioning of the pan, and confirm the presence of the filter pan 101. The sensor 102 may be used to detect the presence and amount of fluid contained within the filter pan 101 to prevent an overflow of fluid into the filter pan 101.

Figure 3:
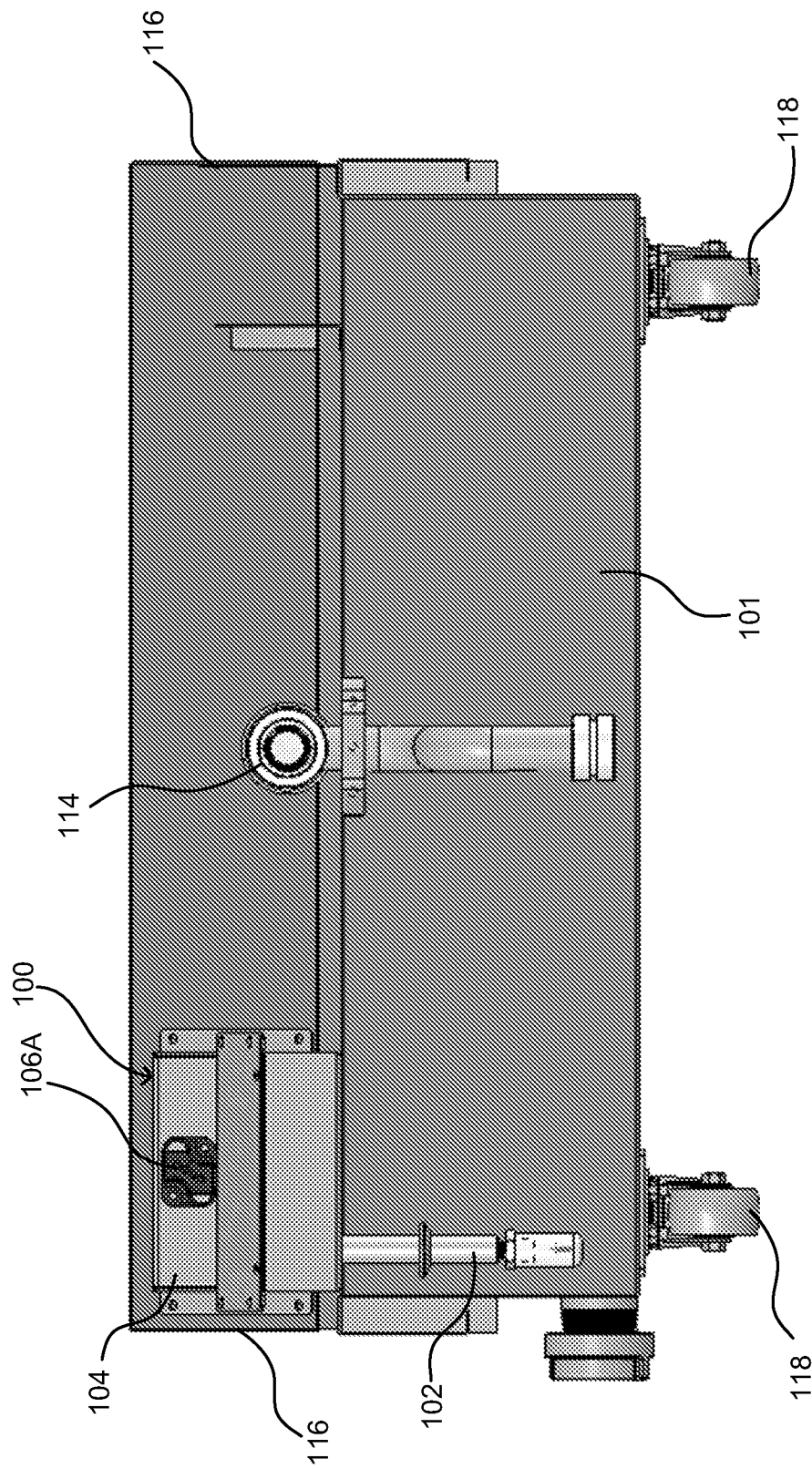
FIG. 3 is an interior view of a removable filter pan with a multipurpose sensing module according to the disclosure.

As illustrated in FIG. 3, the sensor 102 may be coupled to and disposed beneath a bottom portion of a sealed control box 104 of the multipurpose sensing module 100, to position the sensor in a manner extending downward into the filter pan to allow the sensor to measure status and parameters of fluid within the filter pan 101. The sensor 102 may be static, mechanically dynamic, and/or electronically dynamic. An example of a static sensor may be direct loopback wiring. Some exemplary embodiments of a mechanically dynamic sensor may be a physical limit switch and/or a float switch. An exemplary electronically dynamic sensor may be a capacitive sensing device, such as described below with respect to FIG. 10. In an illustrative embodiment the sensor is a capacitive sensor device extending downward into the filter pan beneath a bottom surface of a sealed control box 104 of the multipurpose sensing module 100.

Figure 2:
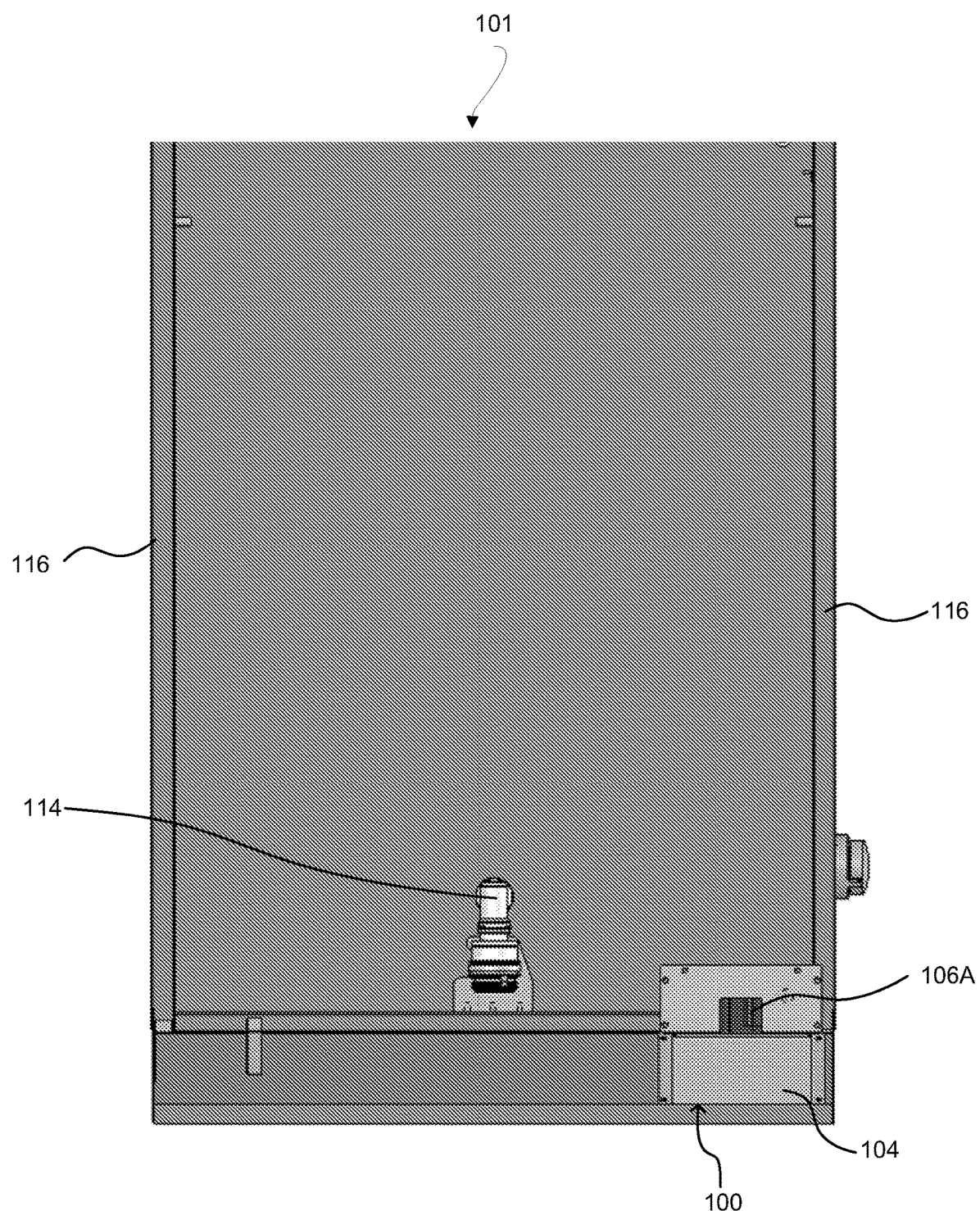
FIG. 2 is a first elevation view of a removable filter pan with a multipurpose sensing module according to the disclosure.
Figure 7:
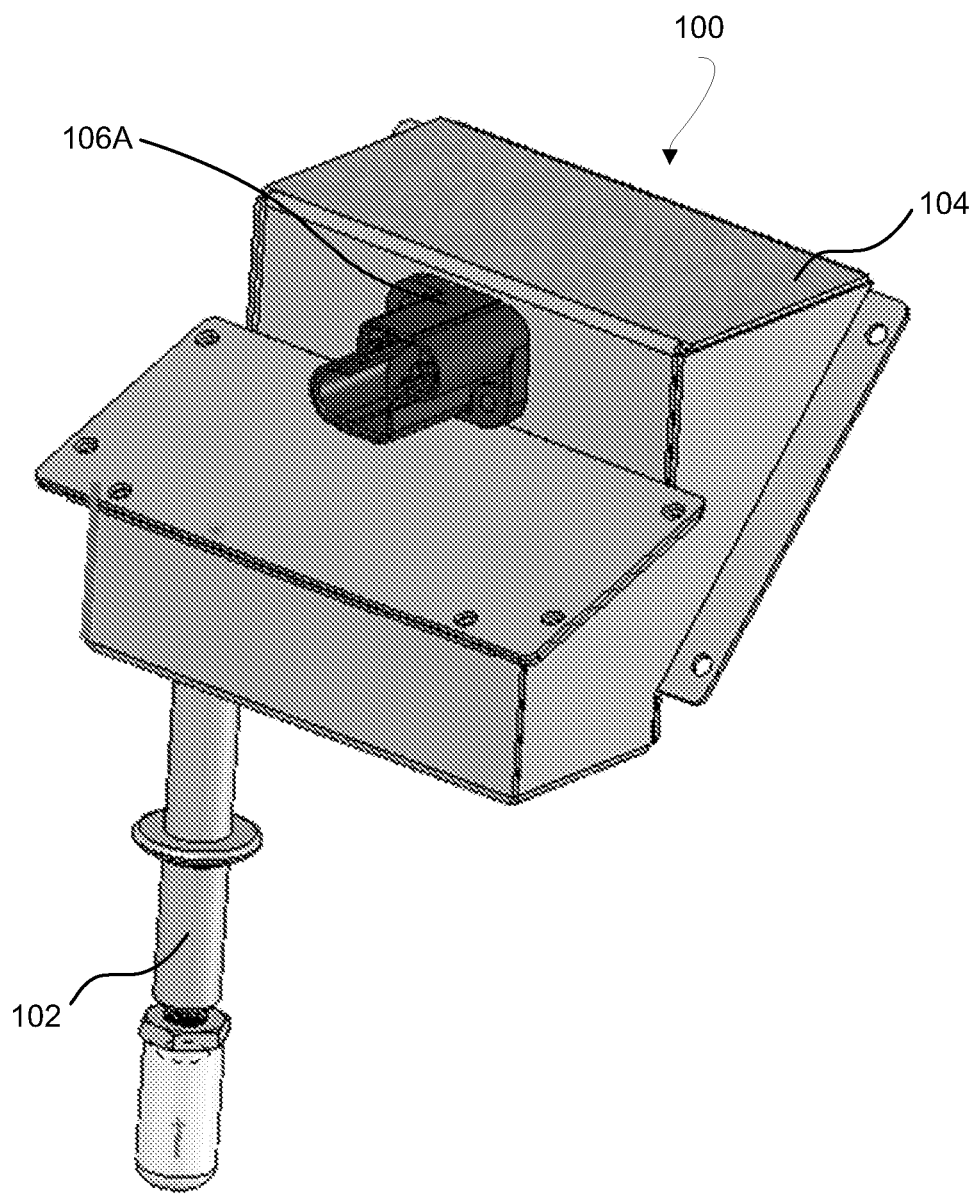
FIG. 7 is a detailed view of a sensor module with a capacitive sensor and connector portion of the multipurpose sensing module in a filter pan according to the disclosure.

The sealed control box 104 and multipurpose sensing module 100, shown in isolated detail in FIG. 7, may be disposed in a filter pan that is configured as a slidable drawer-like structure that can slide in and out of a recess in the controlled fryer system 10. For example, as illustrated in FIGS. 2 and 3, the sealed control box 104 and multipurpose sensing module 100 may be attached in the slidable, removable drain pan at the front portion of the pan facing inwardly toward the interior of the controlled fryer system 10.

The sealed control box 104 may have one or more connectors 106A disposed thereon or proximate thereto adapted to allow the sensor electronics 104 disposed within the sealed control box to interface with the controller 12 in the controlled fryer system 10 when the filter pan 101 is in position, i.e., slid within the recess of the controlled fryer system 10 configured to receive the removable fryer pan. To facilitate interconnection between the main controller 12, the controlled fryer system 10 may include one or more mating connector portions 106B disposed on and within the fryer system cabinet, as illustrated in FIGS. 5 and 6, in alignment with the connector portion 106A on the multipurpose sensing module 100 as the filter pan 101 is slid into position within the recess of the controlled fryer system 10 configured to receive the removable fryer pan.

Figure 5:
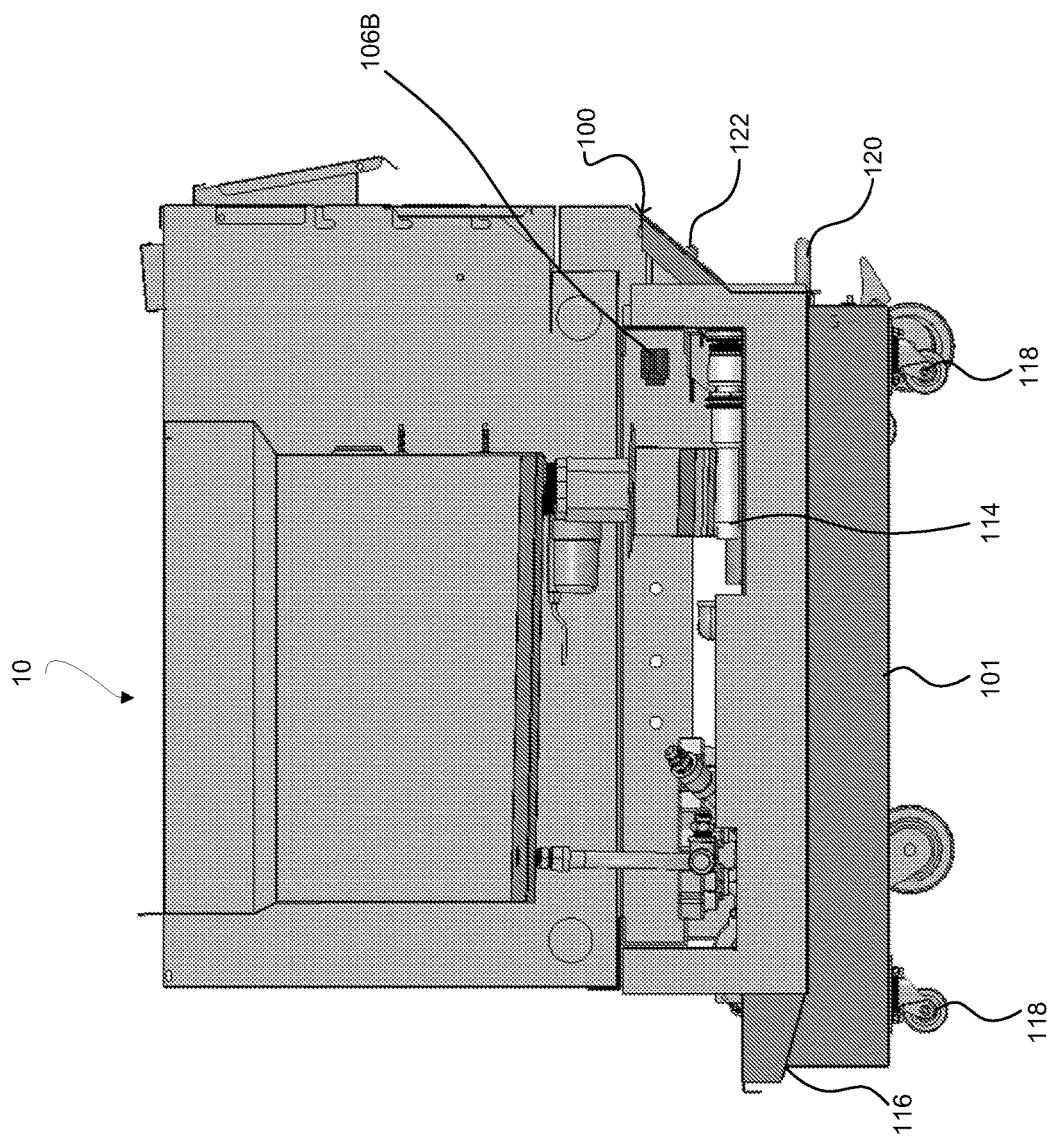
FIG. 5 is a side, partially sectioned view of the controlled cooking system with a multipurpose sensing module of FIG. 1 with the removable filter pan in position according to the disclosure.
Figure 6:
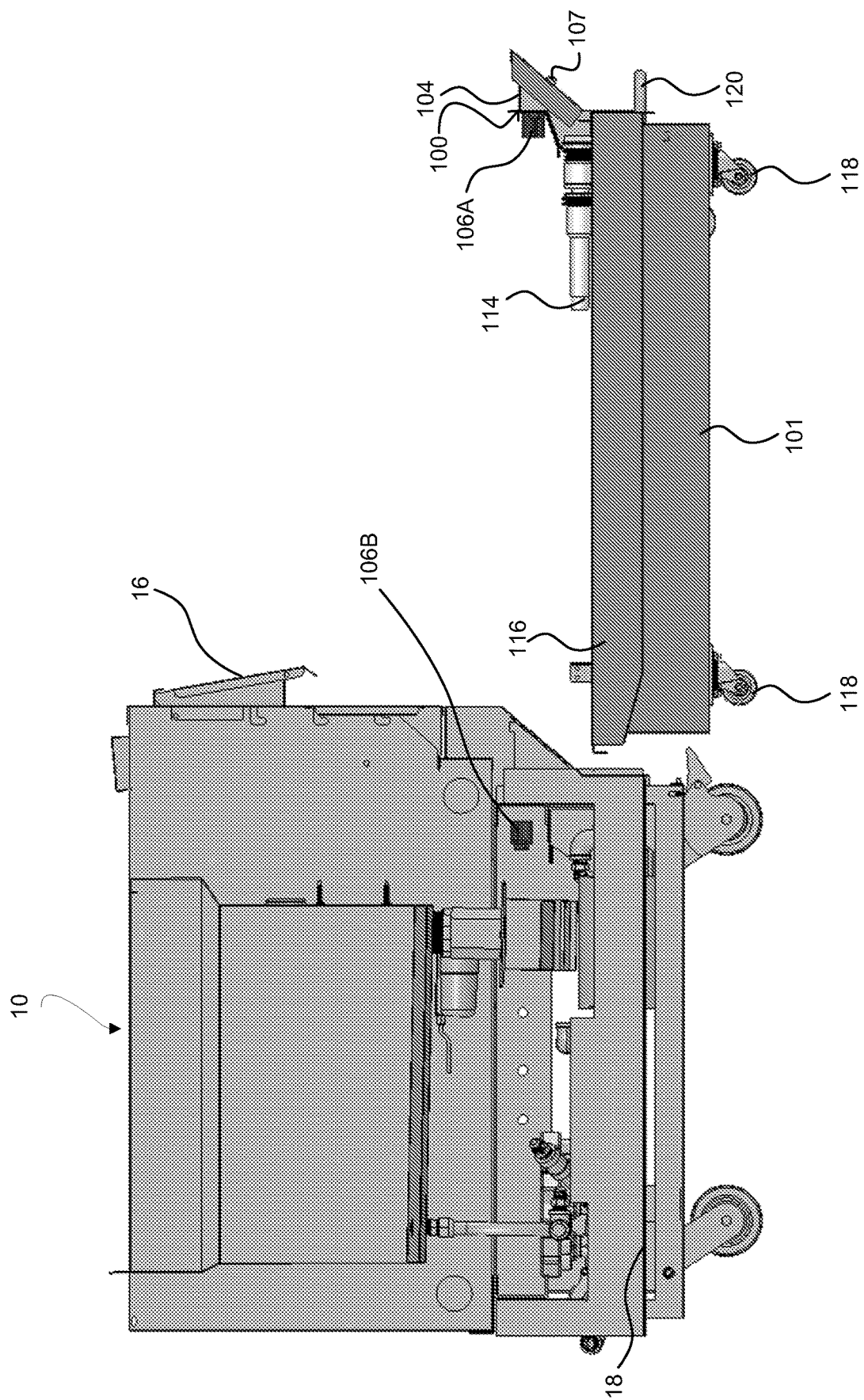
FIG. 6 is a side, partially sectioned view of the controlled cooking system with a multipurpose sensing module of FIG. 1 with the removable filter pan removed out of position according to the disclosure.

To ensure alignment of the recess of the controlled fryer system 10 configured to receive the removable fryer pan, the removable filter pan 101 and fryer system cabinet are configured with physical structures, best illustrated in FIGS. 5 and 6. The filter pan 101 may include pan alignment structures 116, in the form of a sliding abutment surface, to allow the filter pan to be guided into proper position within the controlled cooking system. In an embodiment, the pan alignment structures 116 may be chamfered rails formed along opposite side portions of the filter pan 101. The pan alignment structures 116 may be received and supported by corresponding abutment structures 18 on the controlled cooking system 10 cabinet, against which the pan alignment structures abut and slide in alignment (i.e., so the mating connector portion 106B disposed on the fryer system cabinet is in alignment for connection with the connector portion 106A on the multipurpose sensing module 100) as the pan is slid into and removed outward from the recess of the controlled fryer system 10 configured to receive the removable fryer pan.

The connectors 106 may be oriented in a manner that when the filter pan 101 is properly installed, a blind connection is formed and a separate/manual connection is not necessary to enable interfacing between the controller 12 and the sensor electronics within the sealed control box 104.

Figure 8A:
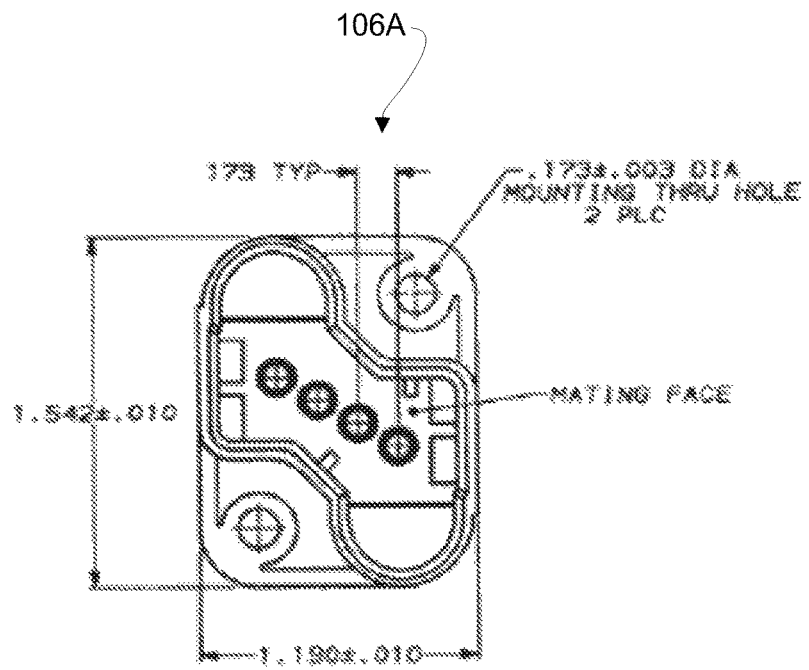
FIGS. 8A & 8B are detailed views of a receptacle housing for a first connector portion of the multipurpose sensing module according to the disclosure.
Figure 8B:
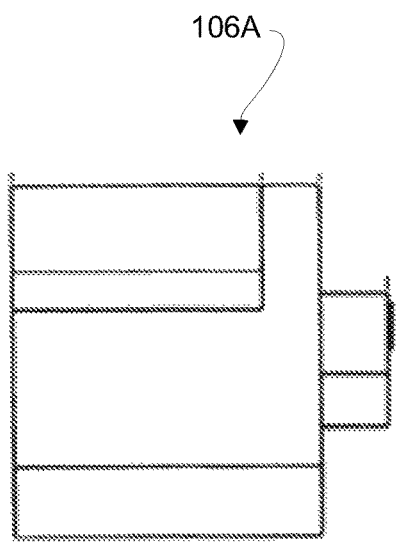
Figure 9A:
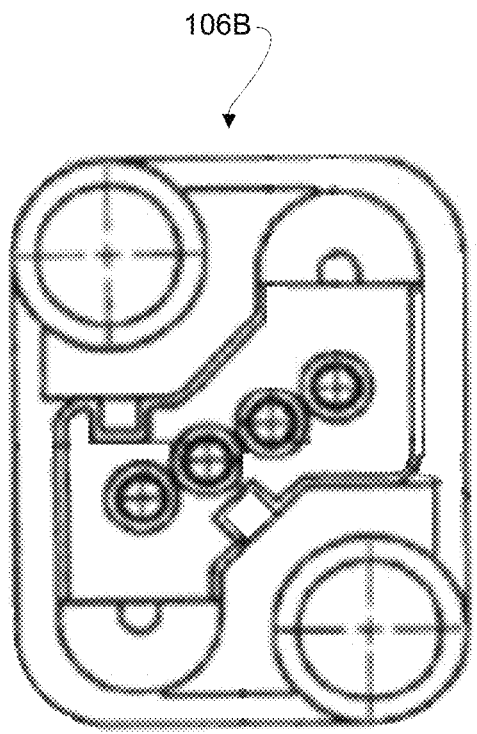
FIGS. 9A & 9B are detailed views of a second connector portion of the multipurpose sensing module according to the disclosure.
Figure 9B:
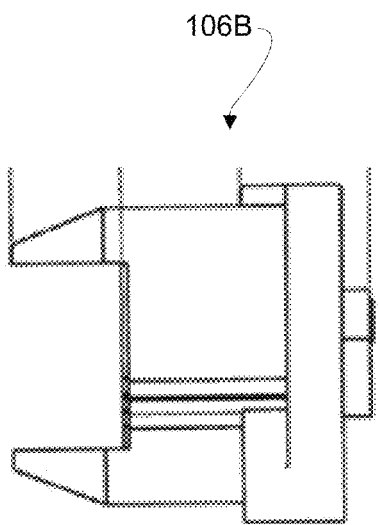

For example, the connector 106 (comprised of portions 106A and 106B) may include a female coupling adapted to receive and blindly couple with a male coupling in the controlled system 10. Alternatively, the connector 106 may also be a male coupling adapted to be blindly coupled into a female coupling disposed within the controlled system 10. An exemplary embodiment of the female coupling, or receptacle housing, 106A is shown in FIGS. 8A-8B. Further, an exemplary embodiment of the male coupling, or plug housing, 106B is shown in more detail in FIGS. 9A-9B.

Figure 4:
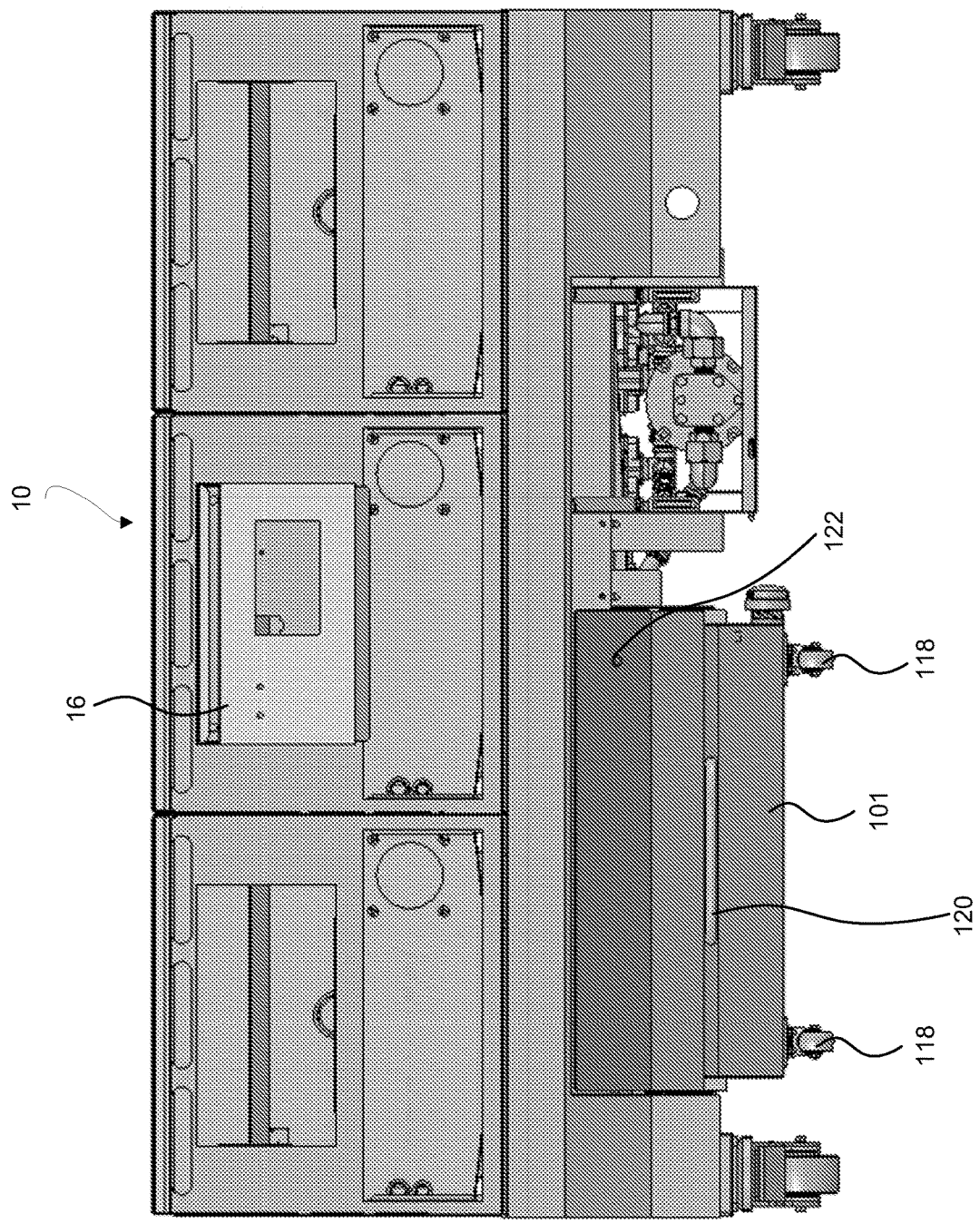
FIG. 4 is a front view of a controlled cooking system with a multipurpose sensing module in a removable filter pan according to the disclosure.

The connector 106 is adapted to determine whether the filter pan 101 is properly positioned (e.g., fully installed) within the controlled cooking system 10 based on whether the receptacle housing 106A and the plug housing 106B are blindly connected within each other. For example, when the receptacle housing 106A and the plug housing 106B are properly coupled to each other, as shown in FIGS. 4 and 5, a blind connection is formed and the sensing module 100 receives power so that an electronic signal can be received from the capacitor and thereby it is determined that the filter pan 101 is properly positioned, i.e., the controller 12 may receive a signal indicating the filter pan 101 is in position because the connector portions are fully engaged. Alternatively, when the receptacle housing 106A and the plug housing 106B are not properly coupled to each other, as shown in FIG. 6, a blind connection is not formed and the sensing module 100 will not provide any signal to the controller 12 thus it may be determined that the filter pan 101 is not properly positioned, and the controller 12 generates a signal indicating the filter pan 101 is not in position.

In an alternative embodiment, the connector 106 may utilize a wireless connection configured to allow wireless power and data communication between the controller 12 and the sensing module 100. When the wireless connection is formed, the sensing module 100 receives power so that an electronic signal can be received from the sensor, e.g., capacitive sensor, and thereby it is determined that the filter pan 101 is properly positioned, i.e., the controller 12 may receive a signal indicating the filter pan 101 is in position.

The sensing module 100 may also provide a visual indicator 107, such as a light emitting diode (LED), adapted to indicate when the blind connection is formed by the connector portions, for example the receptacle housing 106A on the sensing module 100 of the filter pan 101 and the plug housing 106B on the controlled cooking system or fryer 10. The controlled cooking system 10 may also have a display 16 adapted to display the position and status of the filter pan 101 determined by the controller 12. For example, the display 16 may be adapted to display an error message indicating a reason why the controlled cooking system is unable to initiate a fluid filtering operation.

The capacitive sensor 102 (see e.g., FIG. 7) may be connected to sensor electronics that are housed within the sealed control box 104 and support operation of the sensor 102. The sensor electronics are adapted to interface with the main controller or processor 12, that is in communication with an interlock system for control of a subsystem, in the controlled system 10. For example, the sensor electronics housed within the sealed control box 104 may comprise analog to digital (A/D) circuitry to convert a signal from the capacitive sensor into a digital signal for communication to the main controller or processor 12. Further, the sensor electronics may include a power input 108 and power/signal conditioning circuitry that is integrated in the sensor electronics. The power input 108 may be adapted to receive power from the power source 14 when the filter pan 101 is properly positioned within the controlled system 10 (e.g., when the receptacle housing 106A and the plug housing 106B are blindly coupled) and provide power to the sensing module 100. The sensor electronics may also be adapted to provide static feedback 110 and dynamic feedback 112 based on the sensed status parameters and data from the sensor 102. For example, when the sensor 102 measures a capacitance that indicates the filter pan 101 is full of fluid, the sensor electronics may provide feedback to the main controller 12 indicating the filter pan is full of fluid. The sensor 102, sealed control box 104, and power input 108 may be contained within or proximate to a front portion of the filter pan 101 to allow a simple alignment within the controlled cooking system 10 and easier access to components.

As seen in FIGS. 5 and 6, the filter pan 101 may further include a fluidics connection 114 adapted to connect the filter pan to a fluid pumping and filtration system for the controlled cooking system 10 when the filter pan 101 is properly positioned. The fluidics connection 114 is adapted to allow the filter pan 101 to receive cooking fluid from a cooking vat of the controlled cooking system, filter the fluid to remove food particles, and return the fluid to the cooking vat. The filter pan 101 may also include a plurality of casters 118 positioned on a bottom portion of the filter pan to allow the filter pan to be easily rolled on the ground, supporting the filter pan as it is moved into and out of position within the controlled system 10. Additionally, the filter pan 101 may also have a handle 120 to allow a user to safely grasp while moving the filter pan 101.

Figure 10:
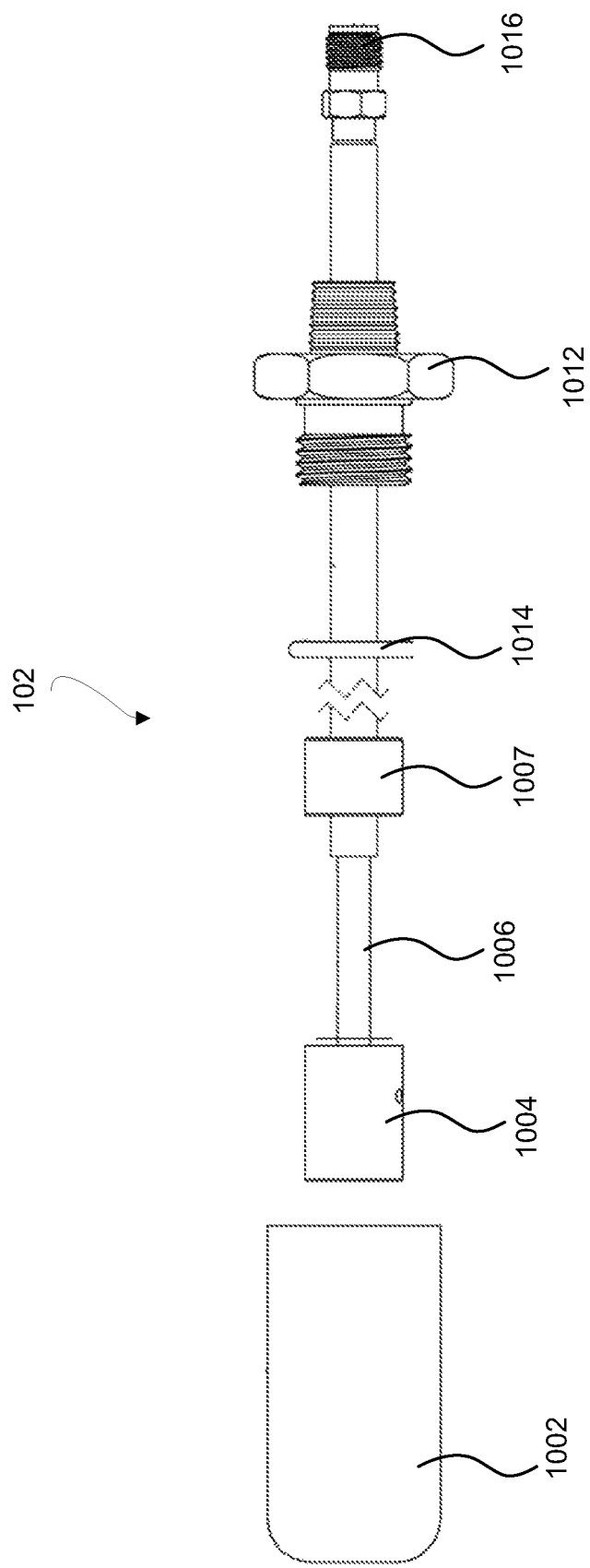
FIG. 10 is an exploded view of a capacitive sensor according to the disclosure.

A capacitive sensor probe 102, for implementation in the multipurpose sensing module 100 according to the disclosure, is illustrated in FIG. 10. The sensor probe 102 is configured and constructed to operate across a wide range of viscosities of fluid, from partially solid to low viscosity, at a wide range of temperatures, and is generally constructed of materials that are "food safe" as the materials may be used in a cooking environment in contact with foodstuffs. In operation, as described in more detail hereinafter, the capacitive sensor probe acts as a "plate" of a capacitor, in conjunction with a metallic portion of the environment in which the sensor 102 is housed (e.g. a portion of the metallic removable filter pan) with the fluid disposed in the environment acting as a dielectric of the capacitor.

The sensor probe 102 senses the capacitance of the fluid that surrounds the sensor 102. In an illustrative embodiment the sensor according to the disclosure is disposed between the walls of a filter pan 101 and substantially below the sealed control box 104, wherein fluid in the pan may be fluid for cooking (e.g. cooking oil, lard or the like) or cleaning fluid (e.g. water or the like). The sensor is configured to sense the capacitance between the sensor and wall of the fryer pan and thereby determine the presence and proper positioning of the removable fryer pan to provide pertinent information to a control system.

The exemplary capacitive sensor may include a metal cylindrical shell or probe radiator 1004 that is disposed at an extreme end (e.g. the bottom disposed within the filter pan) of the sensor assembly and a capacitive probe 1006 disposed adjacent to the probe radiator 1004. The shell 1004 may be encased in or have disposed thereon an insulative layer or sleeve 1002 for insulating the shell 1004. The insulative layer or sleeve 1002 may be made from PTFE, PEEK or other materials that insulate against electrical transmission and/or heat transmission and are also capable of withstanding temperatures such as up to about 500 degrees Fahrenheit. The insulative layer 1002 may help avoid creation of a short circuit, for example if a piece of conductive debris in the fluid being filtered became trapped between the shell 1004 and a metal wall or portion of the filter pan.

The shell/radiator 1004 includes a recess that receives a receptacle press fit into the shell 1004 for electrically conductive engagement with the shell 1004. The receptacle is configured to receive a stripped cable end of a coaxial cable 1006 having a center conductor, dielectric around the center conductor, and outer conductor, forming a coaxial electrode. The center conductor is in electrical continuity with the radiator 1004. The radiator 1004 abuts an insulator 1007 that is configured to fit adjacent the radiator 1004. The insulator 1007 may be made from PTFE, PEEK or other materials that insulate against electrical transmission and/or heat transmission and are also capable of withstanding temperatures such as up to about 500 degrees Fahrenheit. A sensor mount 1012 is disposed adjacent to and abuts the insulator 1007 and may have an O-ring 1014 disposed therebetween. The insulator 1007 and sensor mount 1012 are hollow so that the coaxial electrode 1006 can extend through those bodies. The coaxial electrode 1006 may be encased in PTFE, e.g., heat shrink tube. A stripped cable end of the coaxial electrode 1006, distal from the radiator 1004 is connected to a connector jack 1016, with the outer conductor of the coaxial cable in electrical continuity with a shell portion of the connector jack 1016. In some embodiments of the capacitive sensor 102, a fitting (not shown) may be provided below the radiator 1004 or below the insulator 1007, to configure the sensor 102 to be attached to and removed from a standpipe for inspection, cleaning, replacement or the like.

Other illustrative implementations of a capacitive sensor such as presently implemented, are disclosed in U.S. Provisional Patent Application No. 62/595,804, U.S. Provisional Patent Application No. 62/643,882, U.S. Provisional Patent Application No. 62/643,979, and U.S. Provisional Patent Application No. 62/659,447, the disclosures of which are incorporated by reference herein in their entireties.

Figure 11:
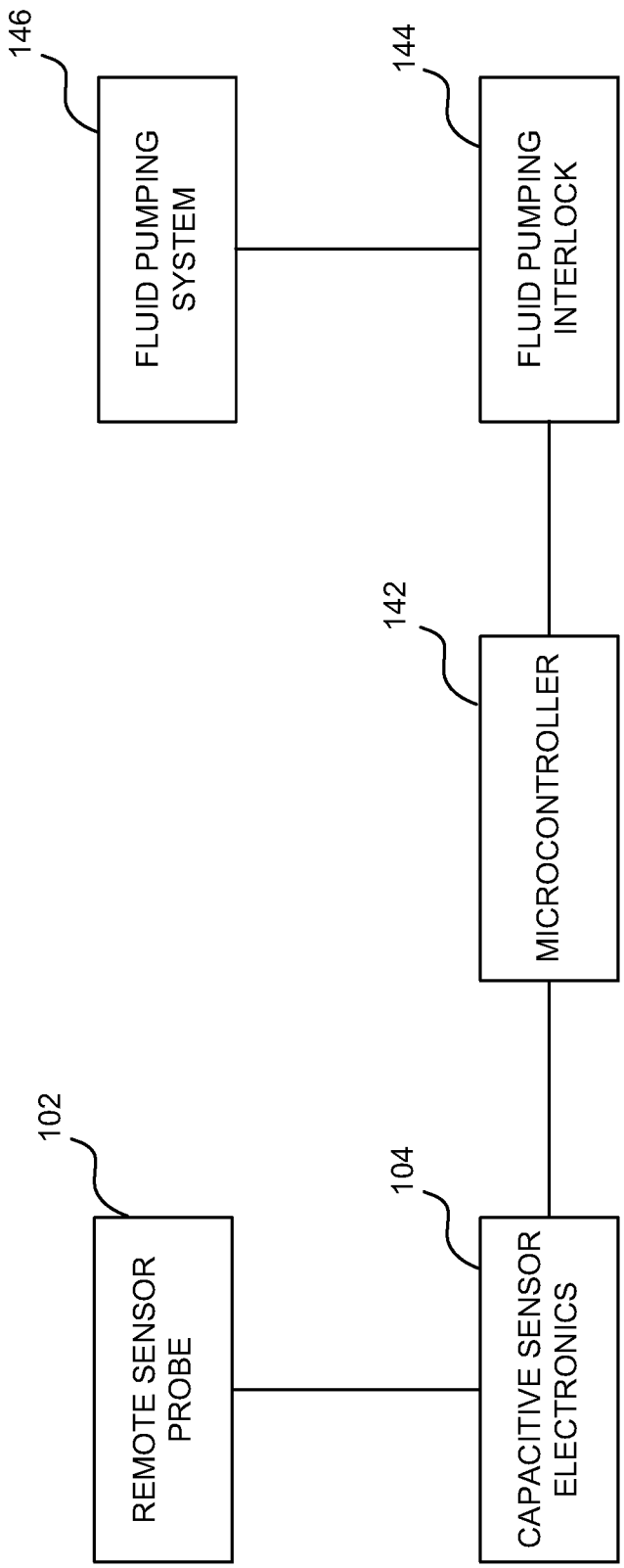
FIG. 11 is a functional block diagram of a controlled cooking system utilizing the multipurpose sensing module in a removable filter pan according to the disclosure.

As illustrated in FIG. 11, in the system according to the disclosure the capacitive sensor probe 102 is in electrical/electronic communication with capacitive sensor electronics contained within the multipurpose sensing module 100. In an illustrative embodiment the sensor electronics may include a Texas Instruments FDC1004 4-channel capacitance-to-digital converter integrated circuit (IC), or substantial equivalent. A capacitive channel of the IC is electrically connected to the inner conductor of the coaxial electrode 1006 which is in turn connected to the radiator 1004 of the sensor probe 102. The IC and metallic portion(s) of the tank are grounded to a common ground. The outer conductor of the coaxial electrode 1006 is electrically connected with the IC as an active or sensing shield to reduce electromagnetic interference and parasitic capacitance from sources other than the sensor 102. The sensor electronics are adapted to convert the analog capacitive signal generated by the sensor electronics into a digital signal for communication, for example via a I$^2$C serial bus, to a microcontroller or processor 142.

Referring still to FIG. 11, the microcontroller 142, for example a STM32 family microcontroller available from STMicroelectronics, Geneva, Switzerland, receives the digital signal from the sensor electronics 104. The digital signal is representative of status parameters and data gathered by the sensor probe 102, and is communicated to the microcontroller 142. The microcontroller 142 is in communication with an interlock system (e.g. a fluid filtration interlock system) 144, which controls (enables/disables) a fluid pumping/filtration system 146 in communication with the interlock system 144.

Figure 12:
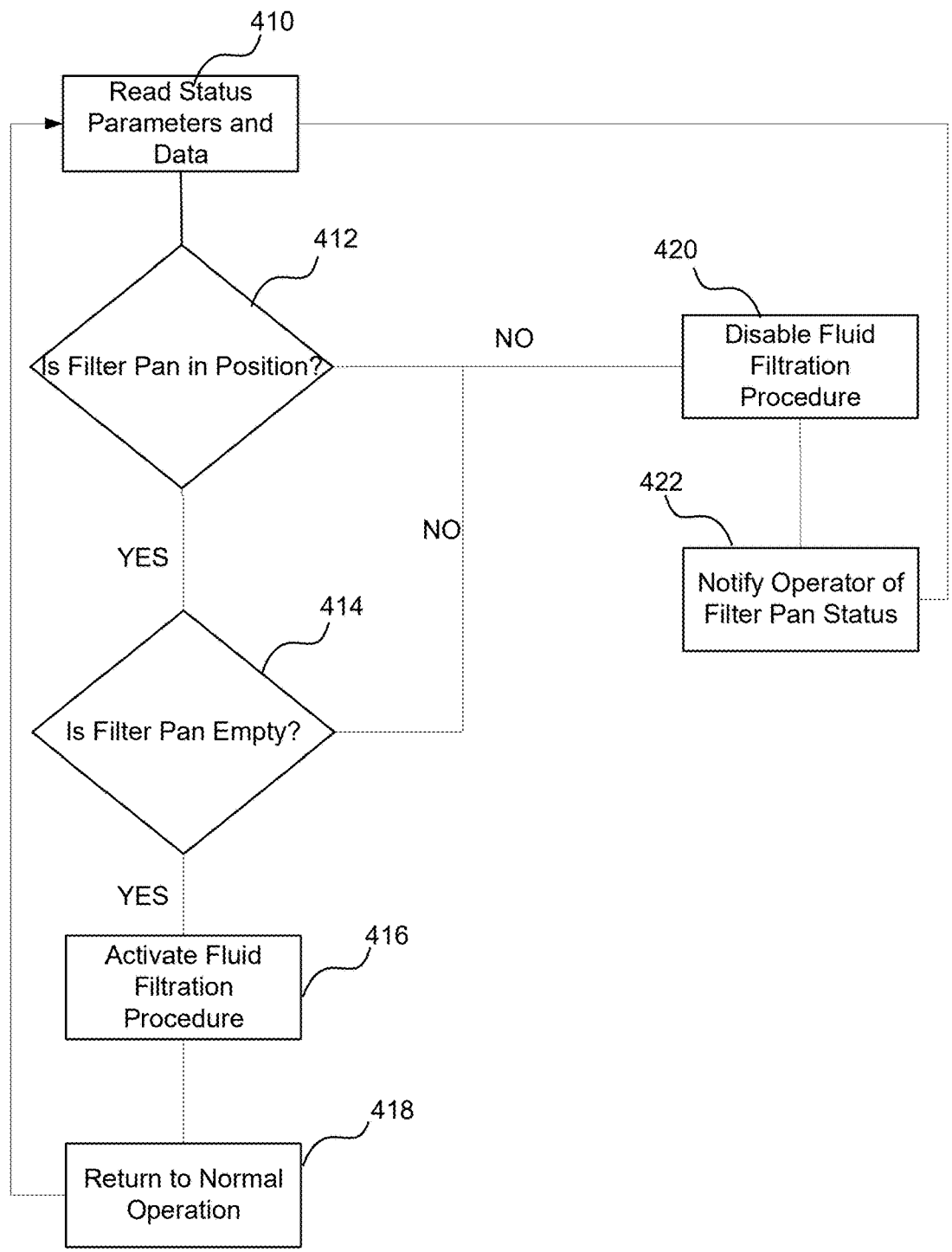
FIG. 12 is a flow diagram of operation of the multipurpose sensing module according to the disclosure.

Referring now to FIG. 12, illustrative processing by the microcontroller 142 is illustrated. The microcontroller 142 reads the status parameters and data 410 from the sensor electronics and determines whether the filter pan is properly positioned in a controlled cooking system 412. The status parameter indicating proper positioning of the filter pan may be based on electrical continuity between the connector pins of the connector portion disposed on the sensing module 100 and the connector portion disposed in the controlled cooking system/fryer cabinet, as described herein. Affirmative signals may be provided to indicate that continuity, and also to provide power to light the LED 122 on the removable filter pan. If the controller determines the filter pan is in position, then the controller may determine if the filter pan is empty 414 to allow the filter pan to receive fluid from the cooking vat in a controlled cooking system.

If the controller determines the filter pan is empty, the controller further determines the appropriate operation or control signal to output 416 to the interlock system, e.g. to enable or disable the fluid pumping/filtration interlock 144 for control of the fluid pumping/filtration system 146. In an illustrative implementation, the interlock system 144 may include a solid state relay to enable or disable the fluid pumping/filtration system 146 (and/or other components of the system that may be connected to the interlock and be enabled/disabled as described herein, e.g., the heating/burner component(s)).

Still referring to FIG. 12, if the controller determines the filter pan is not in position or the filter pan is not empty, then the microcontroller issues a control signal that may disable operation of the fluid pumping/filtration system 416 and it may notify an operator of the status of the filter pan on a display of the controlled cooking system 418. For example, the controlled cooking system may have a display that indicates a status of the filter pan, such as "filter pan is not in place" or "filter pan is not empty".

In an illustrative cooking context, the microcontroller 142 is in communication with a fluid pumping system interlock 144 that controls, e.g. enables or disables, a fluid pumping system such as one or more fluid pumps used to move the fluid through a filter pan to filter the fluid. As a function of the status parameters and data values received by the microcontroller 142, the microcontroller sends a signal to the fluid pumping system interlock 144.

In an alternative embodiment, the controller may determine the appropriate operation or control signal to output 416 to the interlock system, e.g., to enable or disable the heating system for control of heating via one or more burners. The controller may make the determination as a function of the status parameters and data values received by the microcontroller 142. In an illustrative implementation, the interlock system 144 may include a solid state relay to enable or disable the heating system. For example, if the controller determines the filter pan is not in position or the filter pan is not empty, then the microcontroller issues a control signal that may disable operation of the heating system and it may notify an operator of the status of the filter pan on a display of the controlled cooking system 418.

The sensed capacitance of cooking oil is significantly different than the capacitance of air. The capacitance of air is also significantly different than the capacitance of water (or water with a cleaning solution or the like). The different sensed capacitance(s) of different fluids allow the controller to determine a current status of the filter pan, for example whether the filter pan is empty or not. The controller 142, which receives the status parameters and data value signal from the sensor electronics 140 that is representative of the measured status parameters and data from the sensor 102, can determine the positioning and current status of the filter pan and thereby activate the interlock to either allow the pumping/filtration/heating system to operate, or prevent the fluid pumping/filtration/heating system from operating.

Although the multipurpose sensing module within or proximate to a filter pan as described herein is configured and disposed to sense the presence of a removable filter pan in a controlled cooking system in the illustrative embodiment, it should be appreciated by those skilled in the art that rather than a filter pan, the multipurpose sensing system according to the disclosure may be used as described to determine the presence of other removable portions of other controlled systems in a different context other than a fryer system.

While the interlock system and cooking fluid pumping/filtration system are described and illustrated herein as discrete systems, it should be appreciated that the interlock mechanism controlling the controlled system (e.g. fluid pumping system), as a result of the status parameters and data, may be an integrated system with the interlock mechanism as an integrated part of the controlled, e.g. fluid pumping system/pump.

While various embodiments are disclosed herein, it should be understood that the invention is not so limited and modifications may be made without departing from the disclosure. The scope of the disclosure is defined by the appended claims, and all devices that come within the meaning of the claims, either literally or by equivalence, are intended to be embraced therein.

What is claimed is:

1. A controlled cooking system having a cooking system controller and including a removable filter pan, the controlled cooking system comprising:
    a multipurpose sensing module disposed proximate to the removable filter pan, the removable filter pan being removable from the controlled cooking system, and the multipurpose sensing module comprising:
        a capacitive sensor adapted to read a status parameter of fluid disposed within the filter pan;
        a sealed control box housing sensor electronics in communication with the capacitive sensor, the sensor electronics are adapted to receive the status parameter from the capacitive sensor;
        a control box connector portion adapted to allow the sensor electronics to communicate with the cooking system controller of the controlled cooking system;
        a second controller adapted to receive static and dynamic feedback from the sensor electronics based on the received status parameter; and
        the second controller is further adapted to determine whether the removable filter pan is in position based on a signal received from the control box connector portion when the control box connector portion and a cooking system connector portion of the controlled cooking system are blindly coupled together.

2. The controlled cooking system of claim 1, wherein the control box connector portion is coupled to the sealed control box and the cooking system connector portion is coupled to the controlled cooking system.

3. The controlled cooking system of claim 1, wherein the capacitive sensor is coupled to and disposed below the sealed control box.

* * * * *